(12) United States Patent
Hu et al.

(10) Patent No.: US 8,907,592 B2
(45) Date of Patent: Dec. 9, 2014

(54) POWER SYSTEMS FOR DRIVING LIGHT EMITTING DIODES AND ASSOCIATED METHODS OF CONTROL

(75) Inventors: Jin Hu, Hangzhou (CN); Lei Du, Hangzhou (CN); Yuancheng Ren, Hangzhou (CN); Junming Zhang, Hangzhou (CN); Zhijun Ye, Hangzhou (CN)

(73) Assignee: Monolithic Power Sytems, Inc., San Jose, CA (US)

( * ) Notice: Subject to any disclaimer, the term of this patent is extended or adjusted under 35 U.S.C. 154(b) by 922 days.

(21) Appl. No.: 13/048,730

(22) Filed: Mar. 15, 2011

(65) Prior Publication Data

US 2011/0227497 A1    Sep. 22, 2011

(30) Foreign Application Priority Data

Mar. 16, 2010    (CN) .......................... 2010 1 0124649

(51) Int. Cl.
*H05B 37/02*    (2006.01)
*H05B 33/08*    (2006.01)

(52) U.S. Cl.
CPC ........ *H05B 33/0827* (2013.01); *H05B 33/0812* (2013.01); *H05B 33/0809* (2013.01); *Y02B 20/341* (2013.01)
USPC .......................................... 315/308; 315/291

(58) Field of Classification Search
USPC .......... 315/185 R, 209 R, 224–226, 270–276, 315/291, 294, 307, 308, 312
See application file for complete search history.

(56) References Cited

U.S. PATENT DOCUMENTS

| 8,269,429 B2* | 9/2012 | Shin et al. ...................... 315/297 |
| 8,384,305 B2* | 2/2013 | Liao et al. ...................... 315/294 |
| 8,513,902 B2* | 8/2013 | Ohtake et al. ................. 315/307 |
| 2008/0310194 A1* | 12/2008 | Huang et al. ............... 363/21.18 |

* cited by examiner

*Primary Examiner* — Jimmy Vu
(74) *Attorney, Agent, or Firm* — Perkins Coie LLP

(57) ABSTRACT

Embodiments of LED driver circuits and the associated methods are disclosed herein. In one embodiment, the LED driver circuit comprises a switch-mode converter, a controller, a feedback circuit, and a gating circuit. The feedback circuit includes a current balance circuit. The gating circuit is responsive to both a current feedback signal and a voltage feedback signal and is configured to select one of them as the feedback signal.

12 Claims, 7 Drawing Sheets

POWER SYSTEMS FOR DRIVING LIGHT EMITTING DIODES AND ASSOCIATED METHODS OF CONTROL

CROSS-REFERENCE TO RELATED APPLICATION(S)

This application claims priority to Chinese Patent Application No. 201010124649.6, filed Mar. 16, 2010, the disclosure of which is incorporated herein by reference in its entirety.

TECHNICAL FIELD

The present technology relates to power systems for driving light emitting diodes (LEDs) and associated methods of control.

BACKGROUND

LEDs are a type of solid state semiconductor devices capable of converting electrical power into visible light. The application of LEDs primarily comprises LED backlight, LED illumination, and LED display. Currently, cold cathode fluorescent lamps ("CCFLs") are used as a light source in most liquid crystal displays ("LCDs"). The CCFLs have a relatively short lifetime and are not environmentally friendly, and LEDs have been steadily replacing CCFLs as backlight sources.

An LED backlight system commonly includes strings of serially coupled LEDs and a corresponding LED driver circuit. A relative high power supply voltage is typically required to drive the serially coupled LEDs, and the LED driver circuit has to tolerate high voltage stress. The LED backlight system may include over-voltage protection for preventing damage to the LEDs during open circuit. On the other hand, the over-voltage protection also limits the number of LEDs in each of the LED strings. As a result, a plurality of LED strings are coupled in parallel if large numbers of LEDs are needed for luminescence. However, the resistance of a particular LED may be different than others, and thus a current flowing through a particular LED may be different from that through other LEDs. Such current differential may lead to variable luminance of the LED backlight system and/or even damage some of the LEDs.

DETAILED DESCRIPTION

Various embodiments of LED power systems, driver circuits, and methods of control are described below. Many of the details, dimensions, angles, shapes, and other features shown in the figures are merely illustrative of particular embodiments of the technology. As used herein, the phrase an "LED load" generally refers to one LED device, a plurality of LEDs, one LED string, a plurality of LED strings, an LED array, a plurality of LED arrays, and/or other types of LED components with suitable configurations. A person skilled in the relevant art will also understand that the technology may have additional embodiments, and that the technology may be practiced without several of the details of the embodiments described below with reference to FIGS. 1-7.

Aspects of the technology are directed to an LED driver circuit comprising a switch-mode converter, a controller, and a feedback circuit. The switch-mode converter comprises a power transfer device and a switch device, and has an output end coupled to an LED load. The controller has an input end and an output end coupled to the switch device of the switch-mode converter. The feedback circuit is coupled between the output end of the switch-mode converter and the input end of the controller. The feedback circuit comprises a current sensing circuit, a voltage sensing circuit, and a gating circuit. The gating circuit has a first input end coupled to the current sensing circuit, a second input end coupled to the voltage sensing circuit, and an output end coupled to the input end of the controller.

Figure 1:
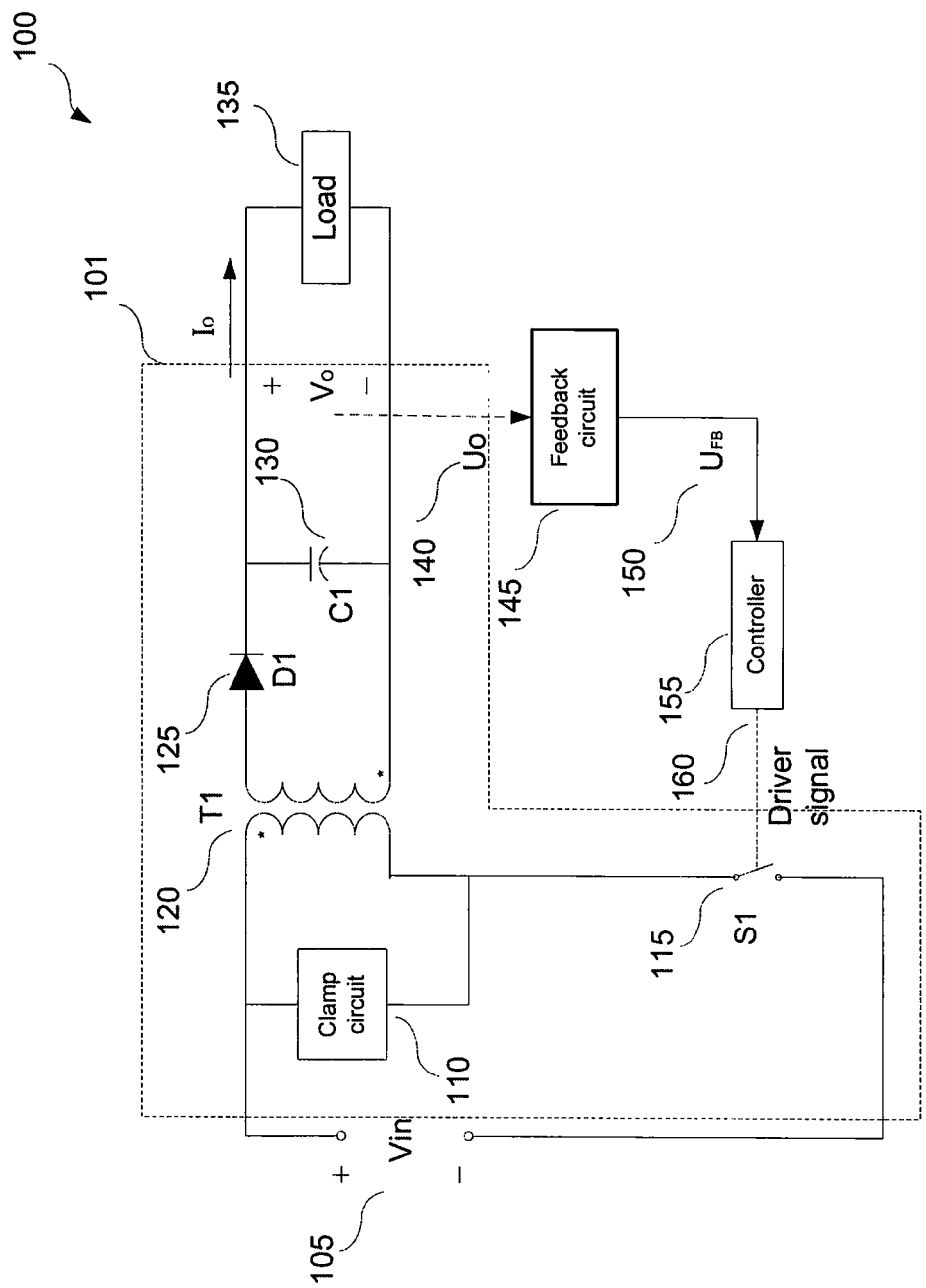
FIG. 1 is a block diagram of a driver circuit according to one embodiment of the present technology.

FIG. 1 illustrates a driver circuit 100 according to one embodiment of the present technology. The driver circuit 100 comprises a switch-mode converter 101, a controller 155, and a feedback circuit 145. The input voltage 105 (as Vin shown in FIG. 1) is introduced to a power transfer device 120 (as T1 shown in FIG. 1) and a switch device 115 (as S1 shown in FIG. 1) of the switch-mode converter 101.

Coupled between the input and the output ends of the driver circuit 100, power transfer device 120 is depicted as a transformer T1 with two windings including a primary side winding and a secondary winding in FIG. 1. However, the transformer conventionally comprises more than two windings, and may include an auxiliary winding configured to provide power for extra load, to provide bias voltage, and/or to detect the load voltage. Clamp circuit 110 is coupled to the primary side winding of power transfer device 120 and is configured to restrict a voltage on a switch device 115. In one embodiment, the switch device 115 may be a transistor, for example, a power metal-oxide semiconductor field effect transistor (Power MOSFET). In other embodiments, the switch device 115 may include other types of transistors and/or other suitable types of component.

When the switch device 115 is closed, a pulse current flows through a rectifier diode 125 (as D1 shown in FIG. 1) and is filtered by a capacitor 130 (as C1 shown in FIG. 1). Then a generally constant output voltage or current is provided to a load 135. Feedback circuit 145 senses an output level 140 (as Uo shown in FIG. 1), which may be a sensed current, voltage, and/or power volume, and provides a regulated current or voltage signal 150 (shown as $U_{FB}$ in FIG. 1) to the controller 155.

In another embodiment, when the output level 140 is below a threshold value (or above a threshold value in other embodiments), the feedback circuit 145 may output a feedback signal 150 independent of the output level 140, for example, a constant value or other predetermined value. The feedback signal 150 is provided to the controller 155 that is responsive to feedback signal 150 and operable to generate a driver signal 160. Switch device 115 is responsive to the driver signal 160 to be turned on and off. Therefore the output of the driver circuit 100 can be regulated in a target range.

Figure 2:
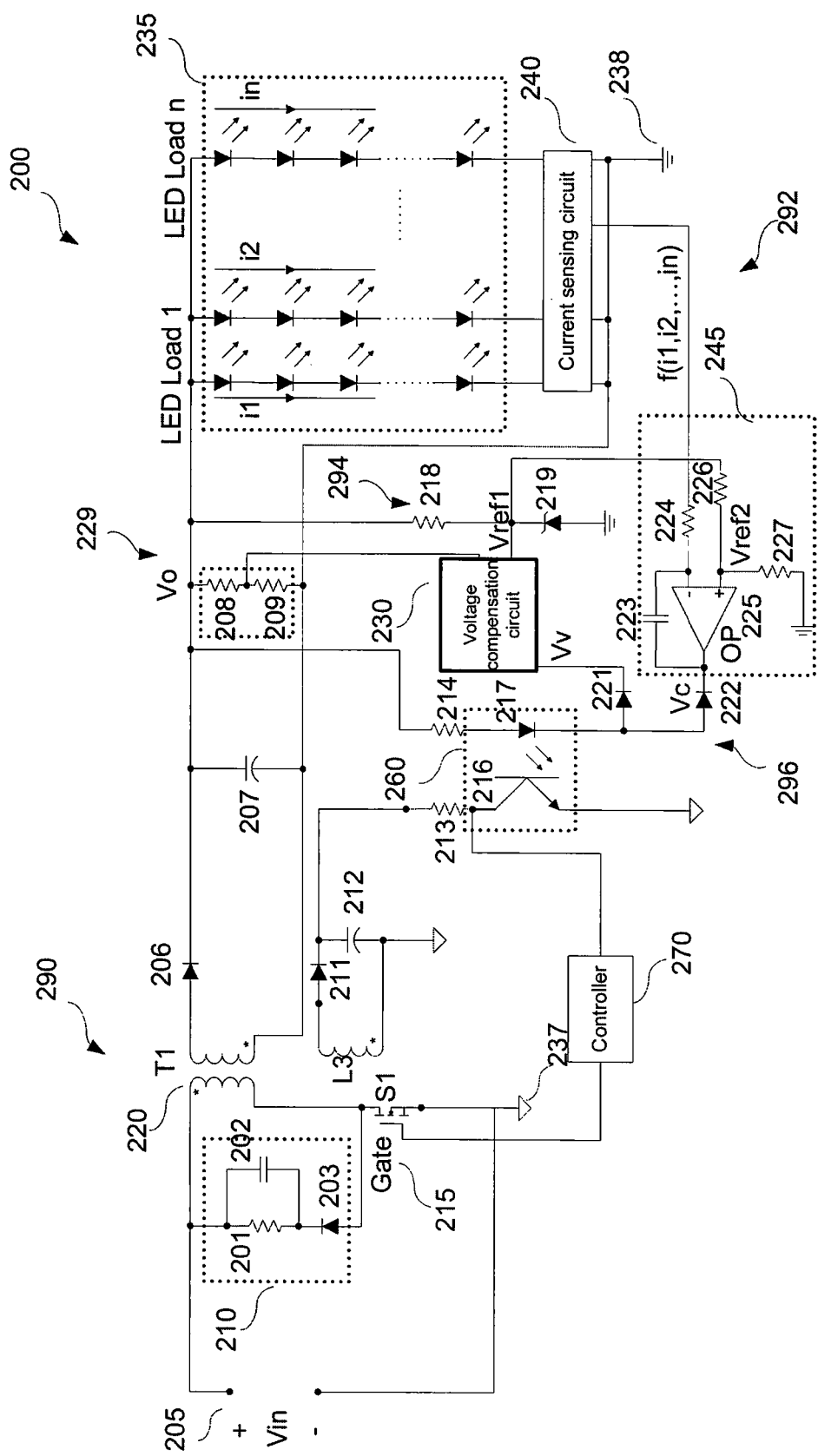
FIG. 2 schematically illustrates a driver circuit according to one embodiment of the present technology.

FIG. 2 illustrates a driver circuit 200 according to another embodiment of the present technology. The driver circuit 200 comprises a switch-mode converter 290, a feedback circuit 292, and a controller 270. The switch-mode converter 290 comprises a power transfer device 220, a switch device 215, a diode 206, and a capacitor 207 as illustrated in FIG. 1. The switch-mode converter 290 may further comprise a clamp circuit 210. The feedback circuit 292 comprises a voltage sensing circuit 229, a current sensing circuit 240, a voltage compensation circuit 230, a current compensation circuit 245, and a gating circuit 296. The feedback circuit 292 may further comprise a reference generating circuit 294, a voltage divider 229, and an optical coupler 260.

The clamp circuit 210 comprises a resistor 201, a capacitor 202 and a diode 203 to restrict the voltage stress on a switch device 215. One end of resistor 201 is coupled to the dotted end of the primary side winding of a transformer 220 configured to receive input voltage 205, and the other end of resistor 201 is coupled to the cathode of the diode 203. The anode of the diode 203 is coupled to the other end of the primary side winding of the transformer 220. The capacitor 202 is coupled in parallel with resistor 201. In the illustrated embodiment, the switch device 215 is a power MOSFET, one end of which is coupled to the primary side winding of transformer 220 and the other end of which is connected to the primary side ground 237. In other embodiments, the switch device 215 may include other suitable types of switching component.

In the illustrated embodiment, the voltage sensing circuit 229 comprises a voltage divider with two resistors 208 and 209 at the secondary side to generate a sensed voltage signal. One end of resistor 208 is coupled to the cathode of a diode 206 to receive the output voltage V0, and the other end is coupled to one end of resistor 209 that is connected to the secondary side ground 238. In other embodiments, the connection node of the two resistors 208 and 209 may be coupled to an inverting input node of a voltage compensation circuit 230. Examples of the voltage compensation circuit 230 are described in more detail below with reference to FIG. 6-7.

A reference voltage generator circuit 294 comprises a resistor 218 and a Zener diode 219. Particularly, in certain embodiments, one end of the resistor 218 receives the output voltage V0 and the other end is coupled to the cathode of the Zener diode 219. The anode of Zener diode 219 is connected to the secondary side ground 238. Thus the resistor 218 and the Zener diode 219 comprise a voltage regulator circuit to generate a stable reference voltage Vref1 and their common end is coupled to a non-inverting input node of the voltage compensation circuit 230. The voltage compensation circuit 230 compares the sensed voltage signal with the first reference voltage signal Vref1, and the output end provides an adjusted voltage signal Vv to the cathode of a diode 221.

The load 235 comprises a plurality of LED strings (Load 1, Load 2 ... Load n) coupled in parallel. One end of load 235 receives the output voltage V0 of the switch-mode converter 290 while the other end of the load 235 is coupled to the current sensing circuit 240. Another end of current sensing circuit 240 is connected to ground 238. The current sensing circuit 240 generates a sensed-current signal f (i1, i2 ... in) representing a load current on the LED strings for LED current balance control.

The current compensation circuit 245 comprises an amplifier 225, a capacitor 223, and a plurality of resistors 224, 226 and 227. The resistors 226 and 227 comprise a voltage divider to generate a second reference voltage signal Vref2. The current compensation circuit 245 converts the sensed-current signal f (i1, i2 ... in) into a current compensation voltage Vc. In some embodiments, one end of a resistor 224 is coupled to the current sensing circuit 240 and the other end of resistor 224 is coupled to the output end of an amplifier 225 as well as the cathode of a diode 222. A resistor 226 receives the first reference voltage signal Vref1 and is coupled to one end of a resistor 227 and to the inverting input node of amplifier 225. The other end of the resistor 227 is coupled to the secondary side ground 238. The resistors 226 and 227 comprise a resistance voltage divider and their common end provide a second reference voltage signal Vref2 to the non-inverting input node of the amplifier 225. The amplifier 225 provides an adjusted current signal Vc.

The gating circuit 296 comprises a first diode 221 and a second diode 222, with their respective anodes coupled together. In the illustrated embodiment in FIG. 2, the gating circuit 296 is coupled to the voltage compensation circuit 230 and the current compensation circuit 245. The cathode of the first diode 221 is coupled to the output end of the voltage compensation circuit 230 and the cathode of the second diode 222 is coupled to the output end of the current compensation circuit 245. The feedback circuit 292 further has an optical coupler 260 coupled between the controller 270 and the anodes of the diodes 221 and 222.

In operation, when Vv>Vc, the diode 221 is reversed and turned off, and diode 222 is turned on. In this situation, the current signal Vc is chosen as the feedback signal so that the circuit operates in a current regulating mode. When Vv<Vc, the diode 221 is turned on and the diode 222 is turned off. Voltage signal Vv is chosen as the feedback signal so that the circuit operates in a voltage regulating mode. Accordingly, when the output voltage is over the over-voltage threshold, the signal Vv from voltage compensation circuit 230 is selected and the driver circuit 200 operates in the over-voltage protection mode to reduce the output voltage. And when the output voltage is below the over-voltage threshold, the current compensation signal Vc is selected and the output currents of the LED strings (Load 1, Load 2, ..., Load n) are balanced in the current balancing mode.

In some embodiments, the transformer 220 further comprises an auxiliary winding L3. The dotted end of the winding L3 and the negative end of the capacitor 212 are both coupled to the primary side ground. The other end of the winding L3 is coupled to the positive end of the capacitor 212 through the rectifier diode 211.

When switch 215 is closed, a pulse current flows through the rectifier 211 and is filtered by the capacitor 212, providing generally constant output voltage or current. The positive end of the capacitor 212 is coupled to one end of the resistor 213 and the other end of the resistor 213 is coupled to the controller 270. In the illustrated embodiment in FIG. 2, the optical coupler 260 has an LED 217 as a source of light and a phototransistor 216 as the sensor. The collector of the phototransistor 216 is coupled to the common end of the resistor 213 and the controller 270. The base of the phototransistor 216 senses the light signal emitted from the LED 217. The emitter of the phototransistor 216 is coupled to ground.

At the secondary winding side, the output voltage V0 of the converter is introduced to the resistor 214. The anode of the LED 217 is coupled to the other side of the resistor 214 while the cathode of LED 217 is coupled to the anodes of the diodes 221 and 222. The resistors 213 and 214, the phototransistor 216, and the LED 217 together comprise an optical coupling circuit. For the light source LED 217, when the potential of the cathode becomes lower, the current flowing through it increases and the brightness is enhanced. When an enhanced light emission is received, the potential difference between the collector and the emitter of the phototransistor 216 becomes lower. In other words, the voltage potential at the collector decreases. Though the sensor of the optical coupler described herein is a phototransistor, in other embodiments, a photo-resistor, a photodiode, and/or other suitable devices may be used as a sensor.

The gate of the switch 215 is coupled to the controller 270. According to the collector potential of the phototransistor 216, the controller 270 determines the turn-on time of the switch 215. When the driver circuit 200 operates in the current regulating mode, as Vv>Vc, the diode 221 turns off and the diode 222 turns on. Vc is chosen as the feedback signal. If the current flowing through the LED load 235 increases, the output value of function signal f (i1, i2, . . . , in) correspondingly increases and thus the feedback signal Vc decreases. Thus, the turn-on time of the switch 215 and the current flowing through the LED load 235 is reduced. When the circuit operates in voltage regulating mode, as Vv<Vc, the diode 222 turns off and diode 221 turns on. Vv is chosen as the feedback signal. If certain issue occurs, for an instance, the LED load is open, the output voltage increases, corresponding to the decrease of Vv as well as the feedback signal Vv. Thus, the on-time of the switch 215 decreases, and the output voltage Vo is restricted in a target range.

Figure 3:
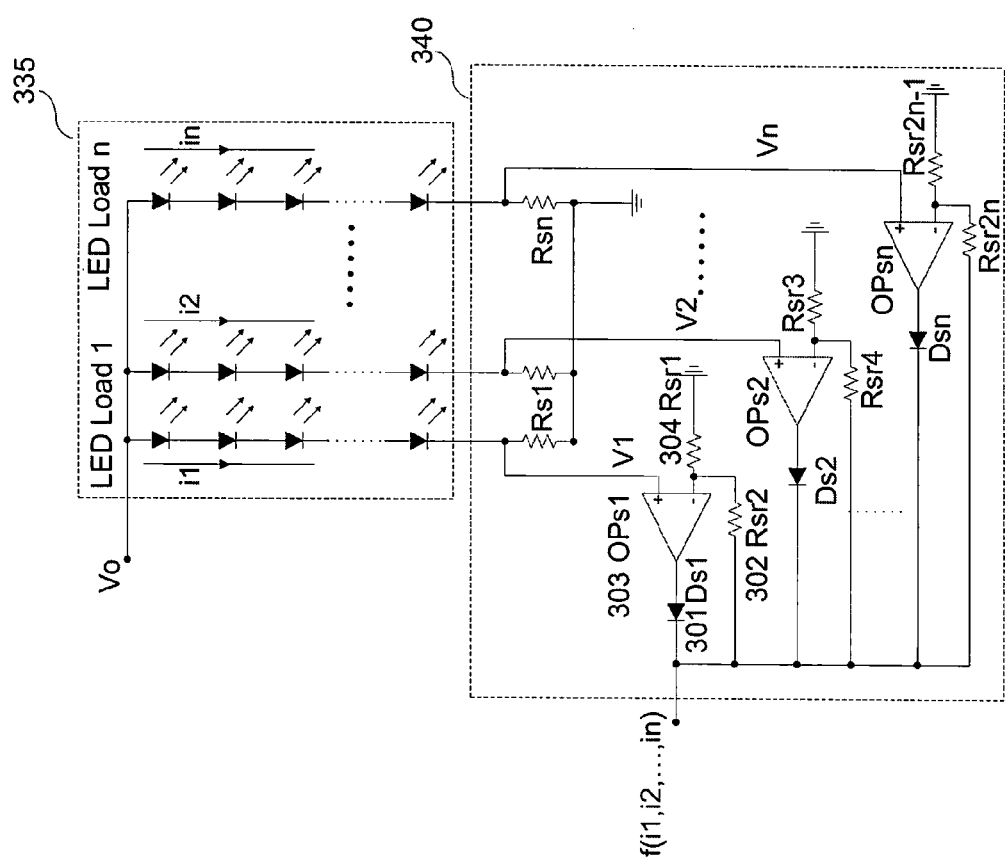
FIG. 3 schematically illustrates a current sensing circuit according to one embodiment of the present technology.

FIG. 3 illustrates a current sensing circuit 340 comprising a plurality of sensing resistors Rs1-Rsn and a maximum function circuit for sensing and selecting a maximum current signal of the LED strings, according to one embodiment of the present technology. As depicted in FIG. 3, each of the LED strings (Load 1, Load 2 . . . Load n) in load circuit 335 is respectively coupled to a resistor (Rs1, Rs2 . . . , Rsn), which are further coupled to ground. As sensing resistors, Rs1, Rs2 . . . Rsn convert a group of flowing current (i1, i2 . . . in) to a group of voltage signals V1, V2 . . . Vn and each voltage signal is outputted to a corresponded amplifier.

The maximum function circuit comprises a plurality of amplifying circuits and a plurality of gating diodes Ds1-Dsn. For example, an amplifying circuit comprises an amplifier 303 and resistors 302 and 304. In one embodiment, voltage V1 is outputted to the non-inverting input of amplifier 303 (as Ops1 shown in FIG. 3). The resistor 304 (as Rsr1 shown in FIG. 3) is coupled to the inverting input of amplifier 303 as well as resistor 302 (as Rsr2 shown in FIG. 3). The other end of the resistor Rsr1 is connected to ground. The anode of the gating diode 301 (as Ds1 shown in FIG. 3) is coupled to the output end of the amplifier 303 and the cathode of gating diode 301 is coupled to the resistor Rsr2. Resistors Rs1, Rsr1, and Rsr2; amplifier Ops1; and gating diode Ds1 together comprise a current sensing circuit unit for an LED load (e.g., LED load 1).

Current sensing units are coupled together at the cathodes of the gating diodes Ds1, Ds2 . . . Dsn configured to provide a functional signal f (i1, i2 . . . in). Amplifiers OPs1, OPs2, . . . , OPsn regulate voltage signals V1, V2, . . . , Vn, and outputs the voltage signals to the anodes of diodes Ds1, Ds2, . . . , Dsn. Because of the conductive property of diodes, only the gating diode that corresponds to the maximum of the proportional voltage signal turns on. The other gating diodes are cut off as their cathode voltages are higher. Consequently, the output functional signal f (i1, i2, . . . , in) of current sensing circuit 340, or the sensed current signal, is a maximum current signal, in other words, f(i1, i2, . . . , in)=k*maximum(i1, i2, . . . , in). Regulating the maximum current signal can facilitate maintaining the current flowing through the LED load 335 is within a target range, and therefore prolonging a useable life of the LED load 335. In other embodiments, the maximum function circuit can have other forms to generate and output the maximum sensed signal.

Figure 4:
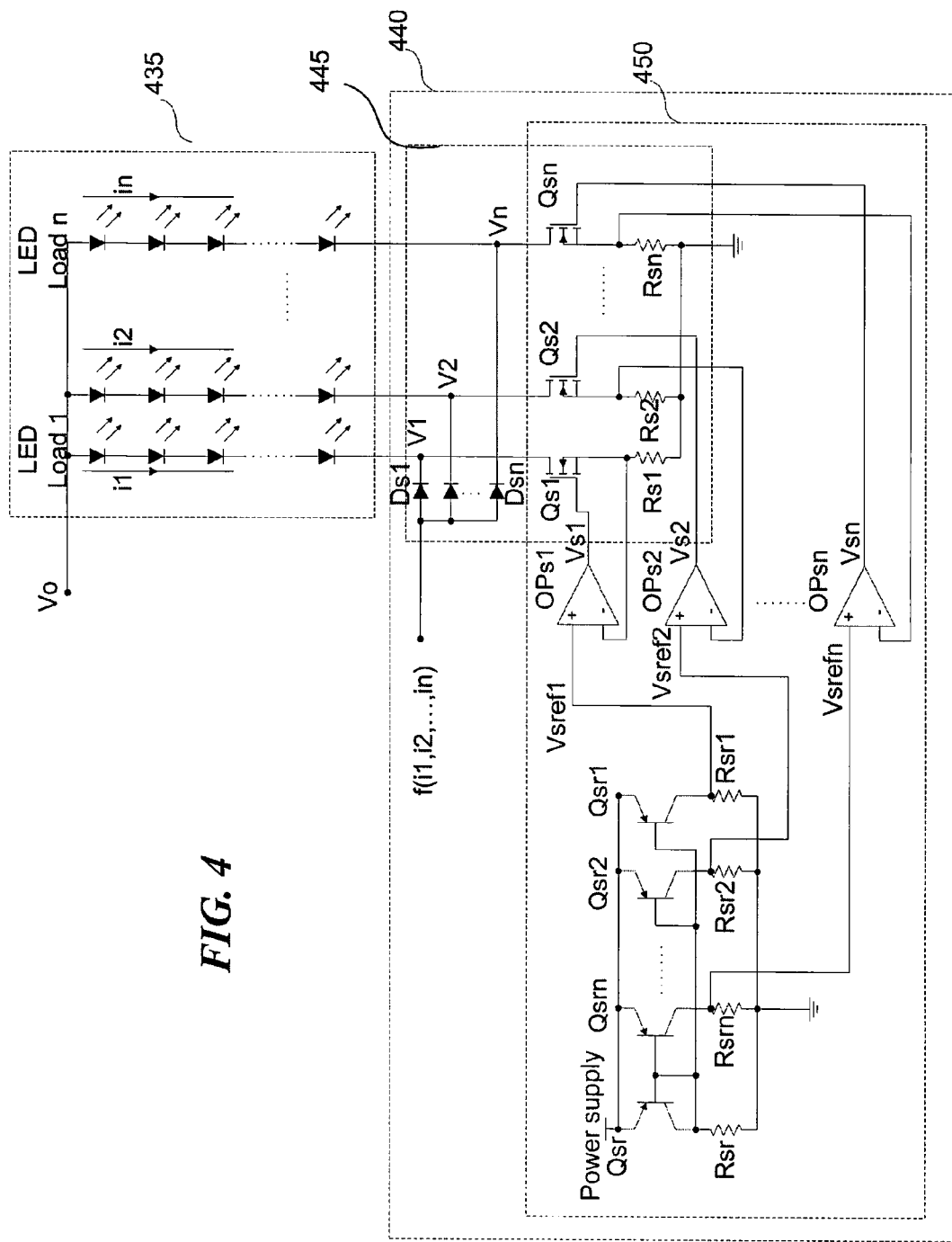
FIG. 4 schematically illustrates a current sensing and balance circuit according to one embodiment of the present technology.

FIG. 4 illustrates a current sensing and balance circuit 440 adopting a minimum function circuit according to one embodiment of the present technology. Circuit 440 has a current sensing circuit section 445. As shown in FIG. 4, an LED load 435 comprises a plurality of LED strings including Load 1, Load 2 . . . Load n. Each LED string is coupled to the cathode of a gating diode (as Ds1, Ds2 . . . Dsn shown in FIG. 3) as well as the drain of a transistor (as Qs1, Qs2 . . . Qsn shown in FIG. 3), respectively. The voltage developed from their common end is labeled as V1, V2, . . . , Vn, and the anodes of gating diodes Ds1, Ds2, . . . , Dsn are coupled together to put out a function signal f (i1, i2, . . . , in).

A sensing resistor (as Rs1, Rs2 . . . Rsn shown in FIG. 3) is connected between the transistor and the secondary side ground to generate a group of voltage signal V1, V2 . . . Vn. In the illustrated embodiment, the sensing resistors Rs1, Rs2 . . . Rsn, the transistor Qs1, Qs2 . . . Qsn and the diodes Ds1, Ds2 . . . Dsn form the current sensing circuit 445. In other embodiment, the current sensing circuit 445 may have a circuit structure consistent with that in FIG. 3 except the conductive direction of the gating diode. In operation, because of the conductive property of diodes, only the gating diode that corresponds to the minimum of the voltage signal turns on. The other gating diodes are cut off as their cathode voltage are higher. Consequently output function f(i1, i2, . . . , in), or the sensed current signal, is a minimum function signal, in other word, f(i1, i2, . . . , in)=k*minimum(i1, i2, . . . , in).

Circuit 440 further comprises a current balance circuit section 450. Current balance circuit 450 generally has a plurality of regulating units. In the illustrated embodiment in FIG. 4, the current sensing circuit 445 and the current balance circuit 450 each have one of the resistance regulating transistors Qs1, Qs2 . . . Qsn, one of the amplifiers OPs1, Ops2 . . . OPsn, a current mirror, and one of the sense resistors Rs1, Rs2 . . . Rsn. The common ends of the resistance regulating transistors Qs1, Qs2 . . . Qsn and the sense resistors Rs1, Rs2 . . . Rsn are coupled to the inverting input nodes of the corresponding amplifiers OPs1, OPs2 . . . OPsn.

A transistor Qsr and a resistor Rsr form the reference branch circuit of the current mirror units, while PNP transistors Qsr1, Qsr2 . . . Qsrn and resistors Rsr1, Rsr2 . . . Rsrn form the mirror branch circuit of each current mirror unit. The common ends of the transistors Qsr, Qsr2 . . . Qsrn and resistors Rsr1, Rsr2 . . . Rsrn are defined as the output ends of current mirrors units which are further coupled to the non-inverting input nodes of amplifiers OPs1, OPs2 . . . OPsn to provide the reference voltage signals Vsref1, Vsref2 . . . Vsrefn, respectively.

The output ends of amplifiers OPs1, OPs2 . . . OPsn are coupled to the gate of corresponding resistance regulating transistors Qs1, Qs2 . . . Qsn. In the illustrated embodiment, the transistors Qs1, Qs2 . . . Qsn are metal-oxide semiconductor field effect transistor (MOSFET). In other embodiments, the transistors Qs1, Qs2 . . . Qsn can include other suitable types of transistors.

The current flowing through the LEDs is restricted in a target range by setting a proper value of the reference voltage signal Vsref1, Vsref2 . . . Vsrefn. When the current im of the LED Load m rises, the voltage developed from corresponding sensing resistor Rsm increases as well. Thus, the amplifier Opm receives a higher input voltage and generates a lower voltage signal Vsm to the gate of resistance regulating transistor Qsm. Responding from the gate signal, the on-state resistance Rds(on) of the transistor Qsm as well as the total resistance of the No. m branch circuit becomes lager. Eventually the current im decreases. Since the current flowing through each branch are followed with reference voltage Vref1, Vref2 . . . Vrefn, the load current is balanced accurately. Even though the minimum function circuit in FIG. 4 comprises a plurality of gating diodes Ds1-Dsn with anodes coupled together, in other embodiments, the minimum function circuit can also have other forms to generate a minimum signal from a plurality of signals.

Figure 5:
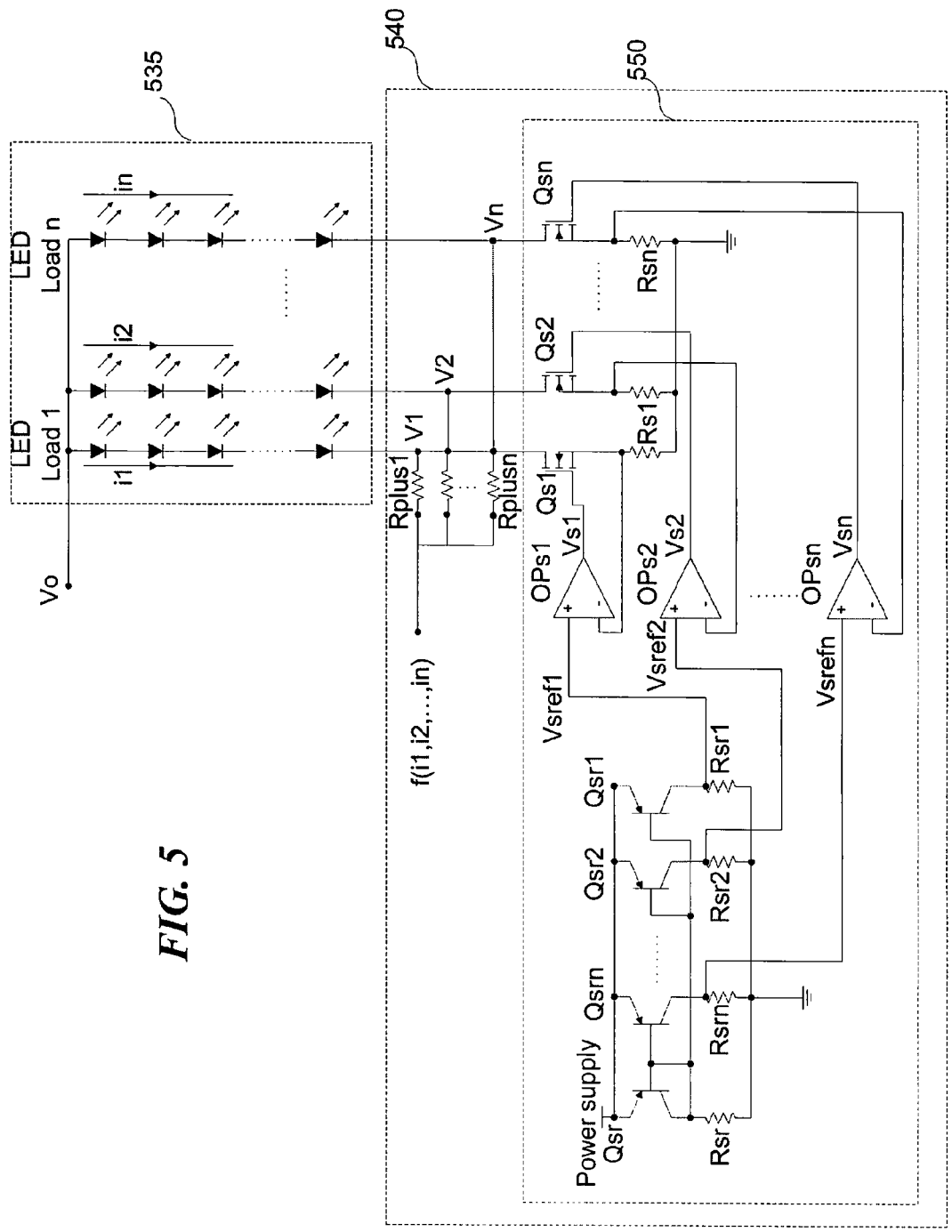
FIG. 5 schematically illustrates another current sensing and balance circuit according to one embodiment of the present technology.

FIG. 5 illustrates a current sensing and balance circuit according to one embodiment of the present technology. Compared with the embodiment shown in FIG. 4, a group of weighted resistors are additionally coupled between the output end of the current sensing circuit and each of the LED load. One ends of weighted resistors Rplus1, Rplus2 . . . Rplusn are coupled together as output ends. The resistors receive a group of voltage signals V1, V2, . . . , Vn converted from the flowing current of each LED load and configured to provide a weighted average function signal f(i1, i2, . . . , in)=k*average(a1*i1, a2*i2, . . . , an*in). The parameters a1, a2 . . . an are defined by weighted resistors Rplus1, Rplus2 . . . Rplusn, the sensing resistor Rs1, Rs2 . . . Rsn and the on-state resistance Rds(on) of transistors Qs1, Qs2 . . . Qsn as follows:

$$a_n = R_{sn} R_{ds(on)n} \frac{\prod_{i=1}^{n-1} R_{plusi}}{\sum_{i=1}^{n} R_{plusi}}.$$

Current balance circuit 550 is generally similar to the circuit 450 in FIG. 4.

Figure 6:
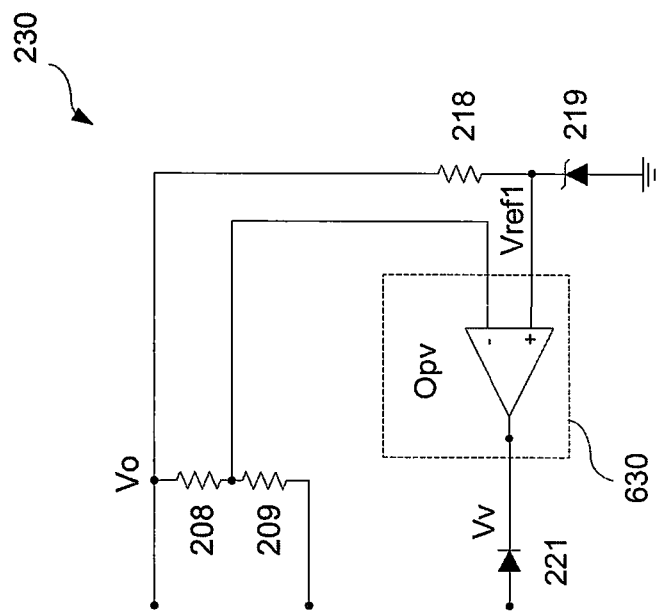
FIG. 6 schematically illustrates a voltage compensation circuit according to one embodiment of the present technology.

FIG. 6 shows one embodiment of the voltage compensation circuit 230 in FIG. 2. The voltage compensation circuit 630 comprises a comparator OPv. A first reference voltage Vref1 is set as the over-voltage threshold value. The inverting input node of comparator OPv receives the sensed voltage signal provided from resistors 208 and 209. If the sensed voltage signal is greater than the over-voltage threshold, the adjusted voltage signal Vv becomes a low level signal smaller than adjusted current signal Vc, and thus is chosen as the feedback signal. On the other hand, if the sensed voltage signal is smaller than the over-voltage threshold, the adjusted voltage signal Vv becomes a high level signal larger than the adjusted voltage signal Vc, and thus Vc is chosen as the feedback signal alternatively.

Figure 7:
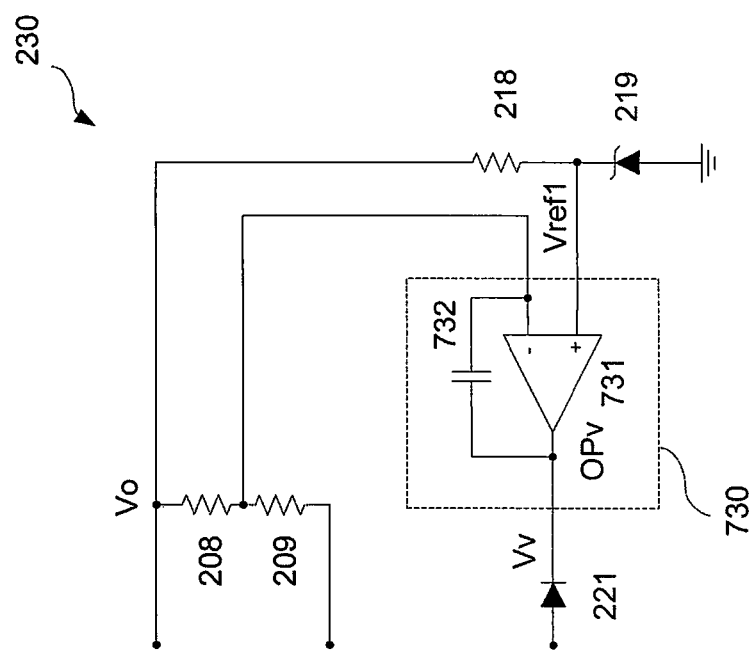
FIG. 7 schematically illustrates another voltage compensation circuit according to one embodiment of the present technology.

FIG. 7 shows another embodiment of the voltage compensation circuit 230 in FIG. 2. Similar to the embodiment shown in FIG. 6, Vref1 is still the over-voltage threshold and the resistors 208 and 209 form the voltage sensing circuit 230. The common end of the two resistors 208 and 209 provides the sensed voltage signal both to the inverting input node of an amplifier 731 and a capacitor 732. The other end of capacitor 732 is coupled to the output end of amplifier 731 configured to prevent amplifier 731 from generating an incorrect signal in case of noise. The sensed voltage signal is compared with the first reference signal Vref1 and generates the adjusted voltage signal Vv.

From the foregoing, it will be appreciated that specific embodiments of the technology have been described herein for purposes of illustration, but that various modifications may be made without deviating from the disclosed technology. Elements of one embodiment may be combined with other embodiments in addition to or in lieu of the elements of the other embodiments. Accordingly, the technology is not limited except as by the appended claims.

We claim:

1. A light emitting diode (LED) driver circuit, comprising:
    a switch-mode converter comprising a power transfer device and a switch device, the switch-mode converter having an output end configured to supply power to an LED load;
    a controller having an input end and an output end, wherein the output end is coupled to the switch device of the switch-mode converter; and
    a feedback circuit coupled between the output end of the switch-mode converter and the input end of the controller, wherein the feedback circuit comprises a current sensing circuit having an output providing a sensed current signal representative of a current flowing through the LED load, a voltage sensing circuit having an output providing a sensed voltage signal representative of an output voltage of the switch-mode converter, and a gating circuit, wherein the gating circuit has a first input end coupled to the output of the current sensing circuit, a second input end coupled to the output of the voltage sensing circuit, and an output end coupled to the input end of the controller to provide an output signal thereto, wherein the output signal is generated based on the sensed current signal when the output voltage is lower than an over-voltage threshold, and based on the sensed voltage signal when the output voltage is higher than the over-voltage threshold.

2. The LED driver circuit according to claim 1, wherein the gating circuit comprises a first diode and a second diode each having an anode and a cathode, and wherein the anode of the first diode and the anode of the second diode are coupled together to form the output end of the gating circuit, and wherein the cathode of the first diode is the first input end of the gating circuit, and the cathode of the second diode is the second input end of the gating circuit.

3. The LED driver circuit according to claim 1, wherein the feedback circuit further comprises:
    a current compensation circuit coupled between the current sensing circuit and the gating circuit, the current compensation circuit comprising an amplifier and a capacitor, and wherein an inverting input node of the amplifier is coupled to the output of the current sensing circuit, a non-inverting input node of the amplifier is coupled to a first reference voltage signal, an output end of the amplifier is coupled to the first input end of the gating circuit, and the capacitor is coupled between the inverting input node of the amplifier and the output end of the amplifier; and
    a voltage compensation circuit coupled between the voltage sensing circuit and the gating circuit, the voltage compensation circuit comprising a comparator, and wherein an inverting input node of the comparator is coupled to the output of the voltage sensing circuit, a non-inverting input node of the comparator is coupled to a second reference voltage signal, and an output end of the comparator is coupled to the second input end of the gating circuit.

4. The LED driver circuit according to claim 1, wherein the feedback circuit further comprises:
    a current compensation circuit coupled between the current sensing circuit and the gating circuit, the current compensation circuit comprising a first amplifier and a capacitor, and wherein an inverting input node of the first amplifier is coupled to the output of the current sensing circuit, a non-inverting input node of the first amplifier is coupled to a first reference voltage signal, an output end of the first amplifier is coupled to the first input end of the gating circuit, and the capacitor is coupled between the inverting input node and the output end of the first amplifier; and a voltage compensation circuit coupled between the voltage sensing circuit and the gating circuit, the voltage compensation circuit comprising a second amplifier and a capacitor, and wherein an inverting input node of the second amplifier is coupled to the output of the voltage sensing circuit, a non-inverting input node of the second amplifier is coupled to a second reference voltage signal, an output end of the second amplifier is coupled to the second input end of the gating circuit, and the capacitor is coupled between the inverting input node and the output end of the second amplifier.

5. The LED driver circuit according to claim 3, further comprising a reference signal generator circuit for generating the first reference voltage signal and the second reference voltage signal, the reference signal generator circuit comprising a resistor and a Zener diode, and wherein:

the resistor has a first end and a second end, the first end is coupled to the output end of the switch-mode converter and the second end of the resistor is coupled to a cathode of the Zener diode;

an anode of the Zener diode is coupled to ground; and the cathode of the Zener diode is further coupled to the non-inverting input nodes of the current compensation circuit and the voltage compensation circuit.

6. The LED driver circuit according to claim 1, wherein the voltage sensing circuit comprises a voltage divider.

7. The LED driver circuit according to claim 1, wherein the feedback circuit further comprises a current balance circuit coupled to the current sensing circuit, and wherein the current balance circuit comprises a plurality of regulating units each having a resistance regulating transistor, an amplifier, a current mirror, and a sensing resistor, and wherein:

the sensing resistor is coupled in serial with a LED load;

the resistance regulating transistor has a drain, a source and a gate, the drain is coupled to the LED load and the source is coupled to the sensing resistor and an inverting input node of the amplifier;

an output end of the current mirror is coupled to a non-inverting input node of the amplifier; and an output end of the amplifier is coupled to the gate of the resistance regulating transistor.

8. The LED driver circuit according to claim 1, wherein the current sensing circuit comprises a plurality of sensing resistors each having a first end coupled to a LED load and having a second end coupled to ground.

9. The LED driver circuit according to claim 8, wherein the current sensing circuit comprises a maximum function circuit, the maximum function circuit comprises a plurality of units each coupled to a corresponding sensing resistor, and wherein each unit comprises an amplifier, a first resistor, a second resistor and a gating diode, and wherein:

the first resistor and the second resistor each have a first end and a second end, and the first end of the first resistor is coupled to ground;

an inverting input node of the amplifier is coupled to the second end of the first resistor and the first end of the second resistor, and a non-inverting input node of the amplifier is coupled to the first end of a sensing resistor;

the gating diode has an anode and a cathode, and the anode is coupled to an output end of the amplifier and the cathode is coupled to the second end of the second resistor;

and wherein the cathodes of the gating diodes are coupled together to comprise the output of the current sensing circuit.

10. The LED driver circuit according to claim 1, wherein the current sensing circuit comprises a minimum function circuit, the minimum function circuit having a plurality of gating diodes, wherein each gating diode has an anode and a cathode, and further wherein:

the cathode of each gating diode is coupled to a LED load; and the anodes of the gating diodes are coupled together to comprise the output of the current sensing circuit.

11. The LED driver circuit according to claim 1, wherein the current sensing circuit comprises a weighted average function circuit, the weighted average function circuit comprising a plurality of weighted resistors and wherein:

each weighted resistor has a first end and a second end, and the first end of a weighted resistor is coupled to a LED load; and the second ends of all weighted resistors are coupled together to comprise the output of the current sensing circuit.

12. The LED driver circuit according to claim 1, wherein an optical coupler is coupled between the controller and the gating circuit.

* * * * *